(12) United States Patent
Dubs et al.

(10) Patent No.: US 10,015,047 B2
(45) Date of Patent: Jul. 3, 2018

(54) AUTONOMIC COMPUTER CONFIGURATION BASED ON LOCATION

(71) Applicant: Lenovo (Singapore) Pte. Ltd., Singapore (SG)

(72) Inventors: Justin Tyler Dubs, Durham, NC (US); Harriss Christopher Neil Ganey, Cary, NC (US); Ratan Ray, Cary, NC (US); Sean Michael Ulrich, Morrisville, NC (US); Jennifer Greenwood Zawacki, Hillsborough, NC (US)

(73) Assignee: LENOVO (SINGAPORE) PTE. LTD., Singapore (SG)

(*) Notice: Subject to any disclaimer, the term of this patent is extended or adjusted under 35 U.S.C. 154(b) by 366 days.

(21) Appl. No.: 14/444,281

(22) Filed: Jul. 28, 2014

(65) Prior Publication Data
US 2014/0337492 A1 Nov. 13, 2014

Related U.S. Application Data

(63) Continuation of application No. 11/874,780, filed on Oct. 18, 2007, now Pat. No. 9,379,941.

(51) Int. Cl.
G06F 9/44 (2018.01)
H04L 12/24 (2006.01)
G06F 9/445 (2018.01)
H04L 29/08 (2006.01)

(52) U.S. Cl.
CPC ...... *H04L 41/0816* (2013.01); *G06F 9/44505* (2013.01); *H04L 67/16* (2013.01)

(58) Field of Classification Search
None
See application file for complete search history.

(56) References Cited

U.S. PATENT DOCUMENTS

| | | | |
|---|---|---|---|
| 8,090,353 B2 | 1/2012 | Aaron et al. | |
| 2002/0039426 A1* | 4/2002 | Takemoto et al. | 381/104 |
| 2002/0198004 A1 | 12/2002 | Heie et al. | |
| 2003/0018805 A1 | 1/2003 | Meyerson | |
| 2003/0078991 A1* | 4/2003 | Harris | 709/218 |
| 2003/0140246 A1* | 7/2003 | Kammer | G06F 21/6218 726/35 |
| 2003/0210142 A1 | 11/2003 | Freathy et al. | |
| 2003/0212824 A1 | 11/2003 | Yoshizawa et al. | |
| 2005/0044063 A1 | 2/2005 | Barsness et al. | |
| 2005/0085272 A1 | 4/2005 | Anderson et al. | |
| 2005/0097311 A1 | 5/2005 | Gopalakrishnan et al. | |
| 2005/0130677 A1 | 6/2005 | Meunier et al. | |
| 2005/0136941 A1 | 6/2005 | Asho et al. | |

(Continued)

OTHER PUBLICATIONS

Justin Tyler Dubs, Harriss Christopher Neil Ganey, Ratan Ray, Sean Michael Urich, Jennifer Greenwood Zawacki, "Autonomic Computer Configuration Based on Location" file history of related pending U.S. Appl. No. 11/874,780, filed Oct. 18, 2007.

(Continued)

*Primary Examiner* — Paul Yanchus, III
(74) *Attorney, Agent, or Firm* — John L. Rogitz; John M. Rogitz

(57) ABSTRACT

A system and apparatus for noticing and creating relational settings, actions, profiles, and tasks by tying resources to a location based on user behavior.

17 Claims, 3 Drawing Sheets

(56) References Cited

U.S. PATENT DOCUMENTS

| | | | |
|---|---|---|---|
| 2005/0179929 A1 | 8/2005 | Jain | |
| 2005/0193100 A1 | 9/2005 | Woolf et al. | |
| 2005/0221844 A1 | 10/2005 | Trethewey et al. | |
| 2006/0053417 A1* | 3/2006 | Henderson et al. | 717/168 |
| 2006/0107219 A1 | 5/2006 | Ahya et al. | |
| 2006/0218303 A1* | 9/2006 | Adelman et al. | 709/245 |
| 2007/0079013 A1 | 4/2007 | Tumsi Dayakar et al. | |
| 2008/0181433 A1* | 7/2008 | Thomas et al. | 381/94.5 |
| 2008/0290985 A1* | 11/2008 | Vogedes et al. | 340/3.1 |
| 2009/0085922 A1 | 4/2009 | Harriss et al. | |

OTHER PUBLICATIONS

Justin Tyler Dubs, Harriss Christopher Neil Ganey, Ratan Ray, Sean Michael Ulrich, Jennifer Greenwood Zawacki, "Autonomic Computer Configuration Based on Location", related application U.S. Appl. No. 11/874,780, Applicant's response to Non-Final Office Action filed Nov. 3, 2014.

Justin Tyler Dubs, Harriss Christopher Neil Ganey, Ratan Ray, Sean Michael Ulrich, Jennifer Greenwood Zawacki, "Autonomic Computer Configuration Based on Location", related application U.S. Appl. No. 11/874,780, Final Office action dated Feb. 26, 2015.

Justin Tyler Dubs, Harriss Christopher Neil Ganey, Ratan Ray, Sean Michael Ulrich, Jennifer Greenwood Zawacki, "Autonomic Computer Configuration Based on Location", related application U.S. Appl. No. 11/874,780, Final Office Action dated Mar. 26, 2015.

Justin Tyler Dubs, Harriss Christopher Neil Ganey, Ratan Ray, Sean Michael Ulrich, Jennifer Greenwood Zawacki, "Autonomic Computer Configuration Based on Location", related application U.S. Appl. No. 11/874,780, Applicant's response to Final Office Action filed Mar. 26, 2015.

Justin Tyler Dubs, Harriss Christopher Neil Ganey, Ratan Ray, Sean Michael Ulrich, Jennifer Greenwood Zawacki, "Autonomic Computer Configuration Based on Location", related application U.S. Appl. No. 11/874,780, Non-Final Office Action dated Jul. 2, 2015.

Ustin Tyler Dubs, Harriss Christopher Neil Ganey, Ratan Ray, Sean Michael Ulrich, Jennifer Greenwood Zawacki, "Autonomic Computer Configuration Based on Location", related application U.S. Appl. No. 11/874,780, Applicant's response to Non-Final Office Action filed Jul. 2, 2015.

Justing Tyler Dubs, Harriss Christopher Neil Ganey, Sean Michael Ulrich, Jennifer Greenwood Zawacki, "Autonomic Computer Configuration Based on Location" related pending U.S. Appl. No. 11/874,780 final office action dated Oct. 16, 2015.

Justin Tyler Dubs, Harriss Christopher Neil Ganey, Ratan Ray, Sean Micheal Ulrich, Jennifer Greenwood Zawacki, "Autonomic Computer Configuration Based on Location", related pending U.S. Appl. No. 11/874,780 applicants response to Oct. 16, 2015 final office action filed Dec. 8, 2015.

Justin Tyler Dubs, Harriss Christopher Neil Ganey, Ratan Ray, Sean Michael Ulrich, Jennifer Greenwood Zawacki, "Autonomic Computer Configuration Based on Location", related pending U.S. Appl. No. 11/874,780, applicants amendment filed Feb. 26, 2016.

* cited by examiner

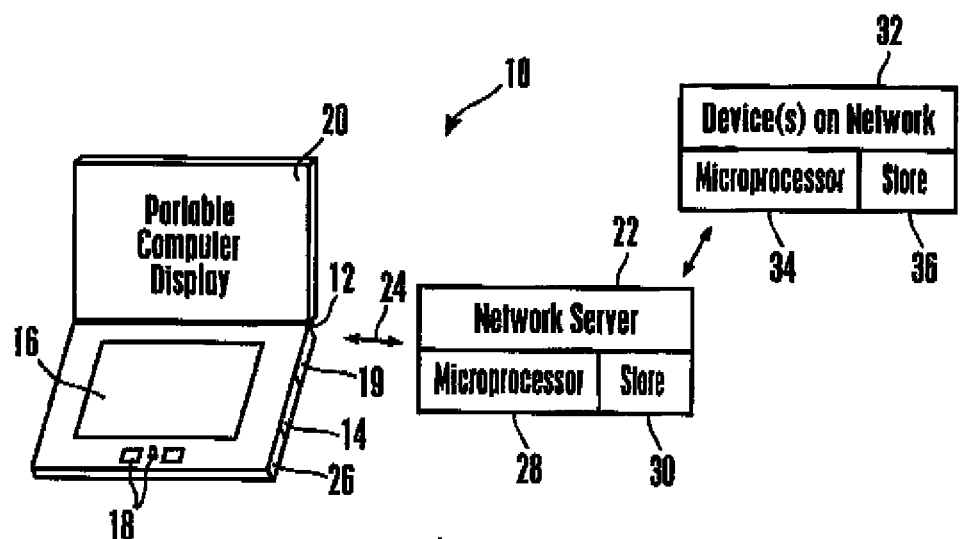
Figure 1
Figure 2
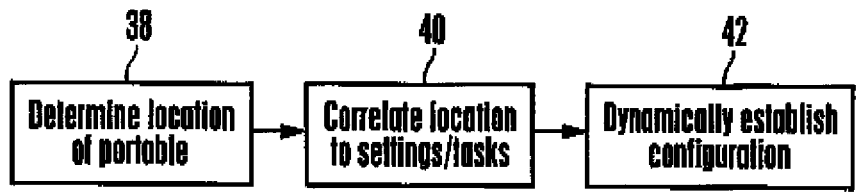

AUTONOMIC COMPUTER CONFIGURATION BASED ON LOCATION

FIELD OF THE INVENTION

The present invention relates to autonomically configuring computers such as portable computers based on the location in which they happen to be.

BACKGROUND OF THE INVENTION

Users of portable computers are often performing configurations and activities multiple times based on their location (network). Some of these activities can be repetitive for the user, and others the user may not be aware of. For example, a user might bring her laptop to work and have to configure it to print to a printer on the work network, and then have to reconfigure the computer when she brings it home to print on a printer in the home network. Indeed, a user's behavior may be different on the computer when in a conference room instead of at her desk. This is but one example of the configuration chores that can be entailed every time a user moves her computer to a new location or network, reducing the ease of portability.

SUMMARY OF THE INVENTION

A method determines a location of a portable computer and dynamically establishes a configuration of the portable computer based on the location.

The location can be determined using global positioning satellite (GPS) or based on detecting a local network with which the portable computer communicates. Additionally, the location can be determined using personal area network (such as but not limited to Bluetooth) connectivity information.

Individual executable programs can be allowed or disallowed network access based on the location of the portable computer. A Bluetooth profile can be used to disallow a network access to at least one program executable by the portable computer.

The configuration includes one or more of launching a web browser, opening a specific web page, launching an email program, launching an instant messenger program, launching a virtual private network, launching a word processing application, opening a specific document, switching default web browser, switching default printer, switching at least one application association, setting a screen resolution, setting autoplay for disks, establishing a power management setting, audio settings such as volume and default audio device, extending or mirroring the screen, changing background/screensaver, activating or deactivating wireless communication capability.

In another aspect, an apparatus includes a digital processor, and a computer storage medium associated with the processor. The processor correlates a location of the apparatus to one or more configurations of the apparatus and establishes the one or more configurations on the apparatus.

In another aspect, a computer readable storage medium is executable by a digital processor to receive a location of a portable computer, correlate the location to at least one setting/task of the computer, and dynamically establish the setting/task based on the correlate act.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting system in accordance with present principles;

FIG. 2 is a flow chart of the overall logic;

DETAILED DESCRIPTION OF THE PREFERRED EMBODIMENT

Figure 3:
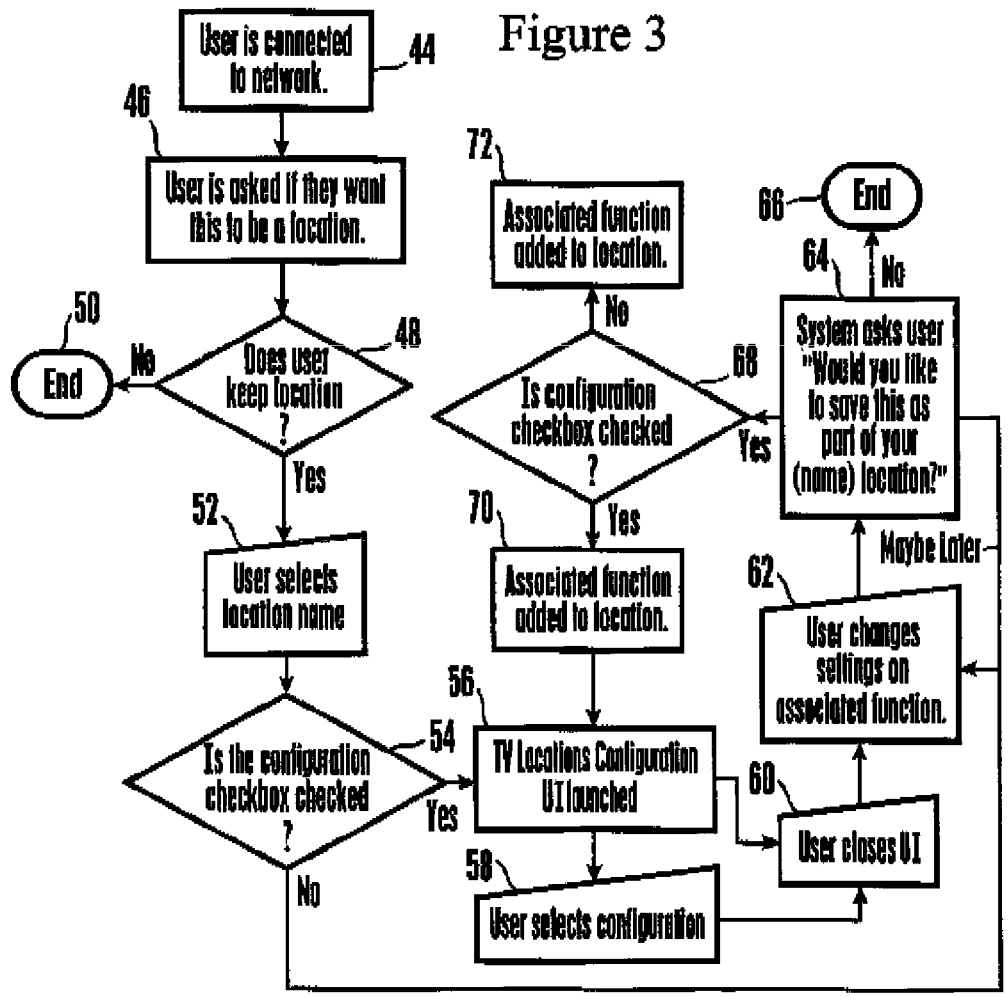
FIG. 3 is a flow chart of non-limiting logic that may be implemented by the present invention.

Referring initially to FIG. 1, a system is shown, generally designated 10, which includes a user computer 12, typically a portable computer such as but not limited to a laptop computer. The computer 12 includes a processor 14 receiving input from one or more input devices such as a keypad 16 and pointing and clicking element 18 that may be embodied as a joystick with click pads as shown. The processor 14 may also receive input from a global positioning satellite (GPS) system 19.

The processor 14 may output information to an output device such as but not limited to a computer monitor 20 or a printer or a network server 22 over a wired or wireless network path 24. The processor 14 may access a computer readable storage medium 26 that may be embodied as solid state memory, e.g., random access memory (RAM), read-only memory (ROM), flash memory, etc. and/or as disk-based memory, removable or permanently installed in the computer. The medium 26 may store logic that can be executed by the processor 14 in accordance with principles herein. In general, the logic of FIGS. 2-4, which are shown in non-limiting flow chart format for ease of exposition without precluding, e.g., state logic, may be stored on one more of the computer readable media disclosed herein for execution by one or more of the processors.

Thus, the network server 22 may include a server processor 28 and server computer readable medium 30. The server 22 may communicate with devices on the network other than the computer 12. For instance, the server 22 may communicate with a network device 32 that has a device processor 34 and device storage medium 36.

In overall operation, referring to FIG. 2 the location of the computer 12 is determined at block 38 in accordance with principles set forth further below. The location is correlated to one or more settings/tasks (collectively, "configuration") at block 40, and then the configuration is dynamically established as appropriate for the location at block 42.

Figure 4:
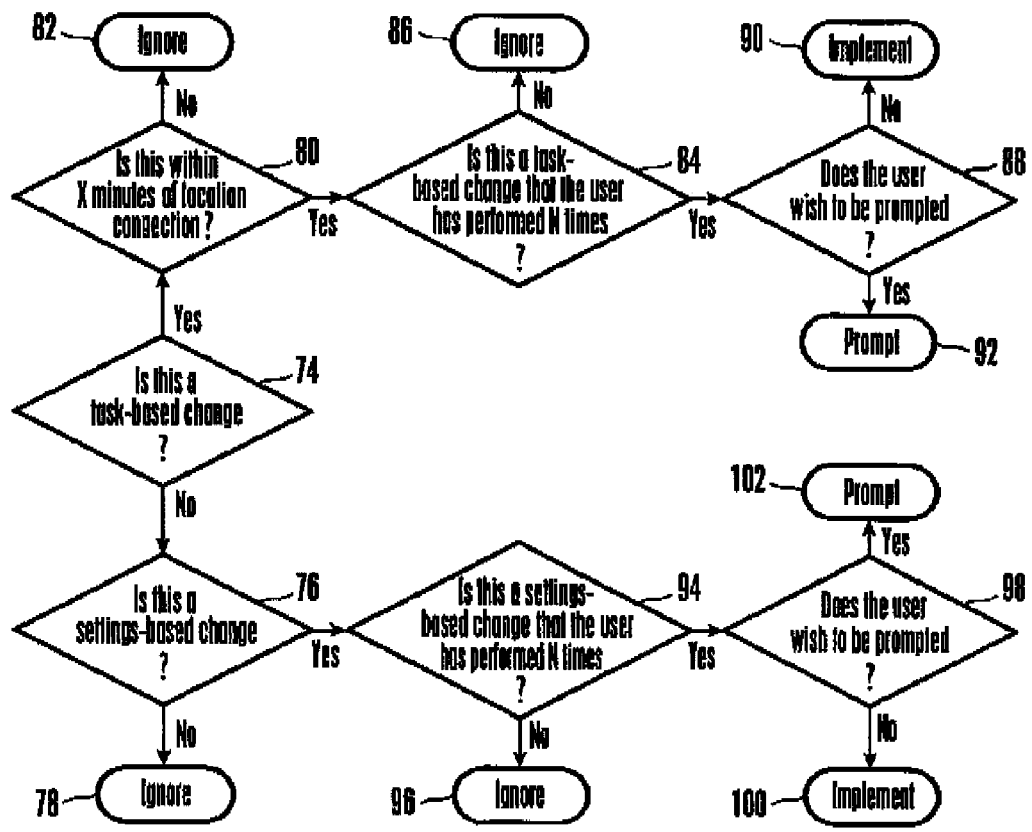
FIG. 4 is a flow chart of additional non-limiting logic that may be implemented by the present invention.

FIGS. 3 and 4 show non-limiting implementation details. It is to be understood that the location of the computer can be determined based on the network and devices to which it is connected, its geographic location as indicated by a global positioning satellite system (GPS), and/or by other networks and devices that are detected nearby the computer 12. Other means for determining location may include time of day (inferring that in the morning the computer 12 must be located at, e.g., an office), a light sensor (inferring that, e.g., under dark conditions the computer 12 must be located at home), camera information (comparing images currently being taken with a database of images that are correlated to locations), which user is logged in (inferring that if, e.g., a parent is logged on the computer 12 is located at a work location), and whether AC power is available (inferring that, for instance, if no AC power is available the computer 12 is not at home or in the office but rather at a roving location, such as an airport). Other heuristics can be used, such as inferring location based on which wired or wireless peripheral devices are communicating with the portable computer.

In general, the system "starts" a location-based configuration on the computer 12 based on what network the computer 12 is connected to. Over time, additional devices and network information are detected. For devices and networks that are repeatedly detected, a location "fingerprint" is created.

The location-specific configuration determines how devices connect to each other. They may always connect regardless of location or never connect, or may connect in only predetermined locations.

Additionally, certain actions are executed when devices are connected. For example, based on the network to which the computer 12 is connected, an antivirus application may always be run on the medium 26, and/or the monitor 20 may always be locked upon connection to a storage.

Further, certain actions may be executed when the computer 12 is in a certain location. For example, a power management regime may be implemented to maximize battery life if the computer is sensed as being connected to a wireless local area network (LAN). The default printer can change based on what network the computer 12 is detected to be in. Certain applications such as, e.g., system updates or performance-decreasing applications might be prevented from running at certain locations, e.g., at work. Ambient light settings can change.

In some implementations, only storage devices on the network that contain appropriate security key information are allowed to connect to the computer 12. In other implementations only devices with encrypted data are allowed to connect in certain locations.

Device autorun settings can change based on location. For example, inserted DVDs may never be autonomically played in some locations, e.g., at work, whereas at a home location, autoplay of DVDs may always be enabled.

A user can manually define a configuration for each location in a list of locations. However, as envisioned herein the computer 12 can "learn" preferred configurations based on location over time.

Accordingly, commencing at block 44 of FIG. 3, assume the computer 12 is detected as being connected to a network. At state 46, the user is asked (by means of, e.g., a question presented on the monitor 26) whether they want this to be designated as a "location". The user inputs the choice at decision diamond 48, and if the answer is no the logic ends at state 50.

Otherwise, the user may select a location name (e.g., "work", "home") at state 52 using one of the above-mentioned input devices and select a configuration check box presented on, e.g., the monitor 20. If the box is checked the logic may proceed to block 56 to launch a user interface on the monitor 20, wherein the user is permitted to select a prestored configuration at state 58. The user interface may be closed at state 60. At state 62, which may also be reached as the result of a negative test at decision diamond 54, the user may be permitted to change settings on associated functions of the configuration selected at state 58, and then immediately or sometime later the user may be prompted to respond as to whether the user wishes the associated function to be added to the location. If not, the logic ends at state 66, but if so the logic moves to decision diamond 68 to determine whether the above-discussed configuration box was checked. If it was, at state 70 the logic adds the associated function to the location (which may be kept as a file of settings and tasks establishing the configuration for that location) and then loops back to state 56. If the box was not checked, the logic moves to state 72 to add the associated function to the location file and end.

Thus, the above-described configuration application knows what it can affect/apply. A user can make a change to one of the above, and the application may suggest to save to current location. This suggestion can occur the first time a user has modified the setting at a location for which the setting has not been specifically set. If the user has selected "later", or has previously set that default, the application can wait until the (nth) time the user makes the same change to prompt again.

In some non-limiting embodiments the location information is determined based on a fuzzy algorithm, with network connections potentially carrying more weight than device connections. The overall weighted match must be within, e.g., 80% of the default location identification information in order to load the location. If the match is not within the tolerance, the best current location is suggested to the user. The user can then either accept the location, make a new location, or ignore this location.

When GPS is used for determining the location of the computer 12, it may be determined how wide a range is included in the current location. This can be determined by starting from a base assumption of area, for example, within one hundred meters of the GPS coordinates of a previous connections—and expanding as new GPS coordinates are determined, each within one hundred meters of at least one known location point, with a higher likelihood of being the same location if the coordinates are within one hundred meters of two or more previously known GPS points for the current location.

When a network location is used in the above logic, the primary determiner of location can be the service set identifier (SSID) of the network that the computer is connected to, if wireless. Or, the primary determiner of location can be the media access code (MAC) address and other information pertaining to wireless access points that the portable computer can detect.

Additionally, the identifications of nearby printers, wireless projectors, attached peripherals (such as a camera, Bluetooth speakers, dock, or other I/O devices) can be used to help distinguish between various locations on the same network. The user computer may have the same SSID when it is located at the user's desk and in a conference room, but in the conference room there might be a wireless projector, which fact can be used to distinguish between a "desk" location (and associated configuration) and a "conference room" location (and associated configuration).

Further, the user's behavior may be different on the computer when in a conference room instead of at their desk. Since the primary location indicator (network SSID) is the same in both locations, but the secondary location indicators (no dock, wireless projector present) are different, different behaviors for the different locations can be learned as explained further below in reference to FIG. 4.

As non-limiting examples, the logic may note that, while the computer 12 is at the "desk" location, the user always does the following: network connection to SSID: "WORK"; system docked with attached USB hard drive, Bluetooth headset detected; computer 12 is running on AC power. Additionally, it may be detected that when at the "desk" location the user typically executes the following tasks:

opens a web browser to the same web page, launches an email application, prints to an office printer, and enables a "sometime" feature.

Continuing the above example, it may be noted that, while the computer 12 is located in a location named "meeting room", the user does the following when in a meeting room: network connection is set to SSID: "WORK"; a wireless projector is detected in the room (can be sensed); the computer 12 is running on its battery. It may further be noticed that the user while in the "meeting room" typically launches a slide application and email application and disables a "sometime" feature.

When the user is at "home" the logic may record that the network connection is set to SSID: "Home"; the computer 12 runs on AC power; and a Bluetooth printer is detected nearby. It may be further noted that the user at "home" typically opens a web browser to a particular page, launches a virtual private network VPN application, prints to a printer named "HomePrinter", launches an instant messenger application, and launches a Skype application.

By noting behaviors as above and correlating them to the location the user names in FIG. 3, the logic can over time establish settings and tasks to mirror the noted behaviors, and then automatically, upon sensing a particular location, autonomically establish a location-based configuration based thereon.

The third case ("home") is fairly easy to distinguish from the first two office-centric locations, since the network SSID is different. To distinguish among the first two cases, the information not only of the SSID, but also of the nearby and attached peripherals can be stored in respective "meeting mom" and "desk" files, thereby noting that the desk location is different than the meeting room location. A weighting can be given to the likelihood of a location being the same as a previous location based on primarily the SSID, and secondarily on how many of the other indicators were the same. The first time the computer 12 is detected to be in a new location with the same SSID as a known location, it can be treated as if the computer were in the same location as the known SSID location with the most matching secondary indicators (possibly none). If the user makes corrections (i.e. closing an application that was started for them), the location might then be designated as being a different location, and user behavior information can then be gathered for that new location.

Non-limiting parameters in accordance with discussion above can be:

Network: SSID for wireless networks, assigned IP address range (from a domain name service) for wired networks.

Attached peripherals: external hard drives, AC power, external keyboard, external mouse, external speakers, attached monitor, USB camera.

Nearby Wireless Devices: Bluetooth Headset, Wireless Printer, Wireless Projector, other computers, UWB (Ultra Wideband) Docks, Wireless Monitors, Cell Phones.

Sensor Information: Ambient Light, Ambient Noise, Camera Pictures, sustained motion information from the accelerometer (this can be useful if on a subway or train), Time of Day (this is useful in 'home office' situations, where the user may be performing work functions during the day and home functions in the evening), which user is logged in A list of possible settings and tasks that can be noted to establish a location file and subsequently form part of an autonomically established configuration for the computer 12 include launching web browser, opening a specific web page, launching an email client, launching instant messenger clients, launching VPN client, launching word processing application, opening a specific document, launching other applications. Also, among the "settings" that can be use to determine location and then later form part of a location-specific configuration include switching default web browser (the logic can determine, e.g., that the user always uses Internet Explorer at work, and Firefox at home), switching default printers (the logic can determine, e.g., that the user always prints to "HomePrinter" at home, and "WorkPrinter" at work), switching application associations (the logic can determine that the user always plays media files with Windows Media Player at work, and iTunes at home), setting desktop resolution, setting autoplay for DVDs, establishing power management settings. Additional configuration options that can be set per location include active network ports, programs that are allowed network access, personal area network profiles such as but not limited to Bluetooth profiles (i.e. disallowing network sharing in certain locations), Bluetooth visibility, blacklisted Bluetooth devices (either by general device type or specific device), display configuration, power management, desktop icons, privacy filters.

FIG. 4 illustrates non-limiting details of the above principles of the present logic. If a change is made to the computer 12 it can be determined at decision diamond 74 whether it is a task-based change. If not, it can be determined at decision diamond 76 whether the change is a settings-based change, and if not the logic ends at state 78.

If the change is task-based, the logic can move from decision diamond 74 to decision diamond 80 to determine whether the change occurred within a predetermined time period of detecting the current location. If not, the change may be ignored at state 82, but otherwise the logic can flow to decision diamond 84 to determine if the change has been performed at least a threshold number of times. If not, the logic can ignore the change at state 86, but otherwise the logic can flow to decision diamond 88 to determine whether the user has previously indicated a desire to be prompted prior to making any changes to the configuration associated with that location. If not, the change is implemented in (becomes part of) the configuration file for that location at state 90; otherwise, the user is prompted at state 92 whether to implement the change in the configuration file.

If it is decided at decision diamond 76 that the change is a settings-based change, the logic may flow to decision diamond 94 to determine whether the change has been performed at least a threshold number of times. If not, the logic can ignore the change at state 96, but otherwise the logic can flow to decision diamond 98 to determine whether the user has previously indicated a desire to be prompted prior to making any changes to the configuration associated with that location. If not, the change is implemented in (becomes part of) the configuration file for that location at state 100; otherwise, the user is prompted at state 102 whether to implement the change in the configuration file.

Accordingly, assume a user of the computer 12 launches a program within a certain time period of connecting to a location. A previously running program accesses the network in a new location, and an "increase productivity" prompt on location connect to launch "advanced settings" wizard may be made but only if no advanced settings have been configured. After the default printer has been changed, the user can be prompted to associate the new default printer to the current location. The associations can be undone if the user immediately cancels/closes the resource or interrupts the action.

Thus, if an event occurs Y % of location connections, minimum N times, the resource can be added to the location.

If the user cancels the resource within X minutes of the next time when it is applied, it is removed from the location association. The cancellation can be weighted and added back into percentage. If desired, automatic cancellations can count more toward the percent of launch than when a user does not launch the resource.

Consider the following example, where the learning threshold is set to 5 repeated resource actions, and 80% of the connection attempts:
N=number of times event has occurred at a specific location.
Y=N divided by total number of times user has been at that location

```
If (N≥ 5) and (Y≥0.8){
add_resource
}
if(user_canceled){
remove_resource
N=N/2
}
```

This will reset the N value so that the resource is not added back in the next time it is launched at that location. This algorithm can also be generalized to relate any user tasks. For example, associating that Notes is always started after AT&T dialer is run. This extension is possible with a dynamically built relational database based on user actions and behavior.

While the particular Autonomic COMPUTER CONFIGURATION BASED ON LOCATION is herein shown and described in detail, it is to be understood that the subject matter which is encompassed by the present invention is limited only by the claims.

What is claimed is:

1. A computer readable storage medium that is not a transitory signal, the computer readable storage medium comprising instructions executable by a processor to:
   identify a location of a first device based at least in part on data from a sound sensor; and
   based at least in part on the identification of the location, automatically execute at least one task at the first device, wherein the at least one task that is automatically executed comprises permitting only other devices with encrypted data to connect to the first device while the first device is at the location.

2. The computer readable storage medium of claim 1, wherein the instructions are executable by the processor to identify the location of the first device based at least in part which user is logged in to the first device.

3. The computer readable storage medium of claim 1, wherein the instructions are executable by the processor to identify the location of the first device based at least in part ambient noise around the first device.

4. The computer readable storage medium of claim 1, wherein the instructions are executable by the processor to present a prompt on a display responsive to a determination that the at least one configuration has been established, while the first device is at the location, at least a threshold number of times greater than one.

5. The computer readable storage medium of claim 1, wherein the at least one task that is automatically executed comprises permitting only storage devices containing appropriate security key information to connect to the first device while the first device is at the location.

6. A first device, comprising:
   a processor;
   a display accessible to the processor; and
   storage accessible to the processor and bearing instructions executable by the processor to:
   identify a location of the first device based at least in part which user is logged in to the first device; and
   automatically establish at least one configuration of the first device based on identification the location, wherein the at least one configuration that is automatically established comprises permitting only storage devices containing appropriate security key information to connect to the first device while the first device is at the location.

7. The first device of claim 6, comprising a sound sensor; wherein the instructions are executable by the processor to identify the location of the first device based at least in part on data from the sound sensor.

8. The first device of claim 6, comprising a sound sensor, wherein the instructions are executable by the processor to identify the location of the first device based at least in part on ambient noise data from the sound sensor.

9. The first device of claim 6, wherein the instructions are executable by the processor to:
   present a prompt on the display for whether to establish the location as a location for which configurations of the first device are to be automatically established based on the location.

10. The first device of claim 6, wherein the at least one configuration that is automatically established comprises permitting only other devices with encrypted data to connect to the first device while the first device is at the location.

11. The first device of claim 9, wherein the instructions are executable by the processor to present the prompt on the display responsive to a determination that the at least one configuration has been established, while the first device is at the location, at least a threshold number of times greater than one.

12. A method, comprising:
   identifying a location of a first device based at least in part which user is logged in to the first device; and
   automatically executing at least one task responsive to identification of the location, wherein the at least one task that is automatically executed comprises permitting only other devices with encrypted data to connect to the first device while the first device is at the location.

13. The method of claim 12, comprising:
   identifying the location of the first device based at least in part on data from a sound sensor.

14. The method of claim 12, comprising identifying the location of the first device based at least in part on ambient noise.

15. The method of claim 12, comprising:
   presenting a prompt on a display for whether to establish the location as a location for which tasks are to be automatically executed based on the location.

16. The method of claim 12, wherein the at least one task that is automatically executed comprises permitting only storage devices containing appropriate security key information to connect to the first device while the first device is at the location.

17. The method of claim 15, comprising presenting the prompt on the display responsive to determining that the at least one task has been executed, while the first device is at the location, at least a threshold number of times greater than one.

* * * * *